United States Patent Office 2,884,462
Patented Apr. 28, 1959

2,884,462
PRODUCTION OF 2,2-BIS(OXYARYL)PROPANE COMPOUNDS

Joseph P. Henry, Kanawha, W. Va., assignor to Union Carbide Corporation, a corporation of New York No Drawing. Application February 28, 1956
Serial No. 568,190

21 Claims. (Cl. 260—613)

This invention relates to the production of 2,2-bis(oxyaryl)propane compounds. More particularly, the invention relates to the production of 2,2-bis(oxyaryl)propane compounds by the reaction of an oxyaryl compound, such as phenol, ortho-cresol, anisole, ortho-methyl anisole, and like compounds with an acyclic $C_3H_4$ hydrocarbon.

Heretofore, one of the processes for making 2,2-bis(oxyaryl)propane compounds, such as 2,2-bis(4-hydroxyphenyl)propane, has been by the condensation of an oxyaryl compound, such as phenol, with acetone in the presence of acidic condensation agents, such as sulfuric acid and hydrogen chloride. Water, which is a co-product of the reaction, adversely affects the rate of formation of the 2,2-bis(oxyaryl)propane. As a result, extended reaction periods are necessary for good yields unless expensive dehydration steps are employed. In order to avoid the undesirable features of the acetone process, it has more recently been proposed to employ a saturated dihalide such as 2,2-dichloropropane or an unsaturated monohalide such as 2-chloropropene or a bis(organo-mercapto) methane instead of acetone as a co-reactant with the phenol. But these processes are also characterized by a number of undesirable features such as low yields, poor product quality, undesirable resinification and by-product formation, and in some instances by long reaction periods and extensive methods for the recovery of the 2,2-bisphenolic propane.

I have discovered that a 2,2-bis(oxyaryl)propane is produced by admixing and reacting an oxyaryl compound with an acyclic $C_3H_4$ hydrocarbon in the presence of an acidic condensing agent, according to the following scheme:

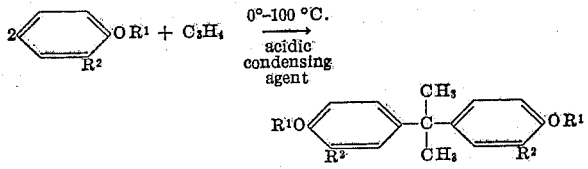

wherein $R^1$ and $R^2$ are hydrogen or lower alkyl groups.

The oxyaryl reactants useful in the process of this invention are those corresponding to the general formula

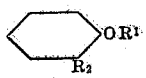

where $R^1$ and $R^2$ can be hydrogen or a lower alkyl group, such as methyl, ethyl, propyl, and the like, with $R^1$ and $R^2$ being either the same or different.

I have further discovered that alkyl substitution on the benzene ring should be only in the ortho position with respect to the oxy group. Alkyl substitution in the meta position of the benzene ring, I have found, produces spirohydridene and spirochroman structures, with very little or no yield of the desired meta-alkyl substituted bis(oxyaryl) propane compound.

Among the oxyaryl compounds which have been found particularly useful in practicing the process of this invention are phenol, anisol, ortho-cresol, and ortho-methyl anisole. Especially good yields of 2,2-bis(4-hydroxyphenyl) propane are achieved using phenol as the oxyaryl reactant.

The acyclic $C_3H_4$ hydrocarbons found suitable for use in producing the 2,2-bis(oxyaryl) propanes according to the process of this invention are propadiene (allene, $CH_2=C=CH_2$) and propyne (methyl acetylene

and mixtures thereof. These $C_3H_4$ hydrocarbons exist in many plant streams of cracked parafins, and in propane-propylene and olefin gas streams and are easily removed from the main gas stream by known means, such as by extraction or scrubbing.

These $C_3H_4$ hydrocarbons exist as a gas at standard temperatures and pressures, and are best added to the reaction mixture through a suitable gas diffuser below the surface of the reaction mixture. However, if desired, the reaction can be conducted by maintaining an atmosphere of the $C_3H_4$ hydrocarbon gas above the reaction mixture. If sufficient agitation is provided, satisfactory contact of liquid and gas can be obtained for the process to be carried out.

My process has the advantage of being able to use mixtures of the $C_3H_4$ hydrocarbons without the necessity of separating and purifying individual propadiene or propyne fractions prior to the reaction with the oxyaryl compound. The reaction of the propadiene or propyne or mixtures thereof is not inhibited by the presence of inert gaseous diluents for instance saturated parafins as methane, ethane, and propane; and also nitrogen, argon, neon, and the like. It is not necessary that such inert materials when present, be removed from the $C_3H_4$ stream. In some cases it may be desirable to add such inert diluents as an aid in controlling the reaction temperature and rate of addition of the $C_3H_4$ reactants.

The amounts of reactants in this process are not narrowly critical. In practice, however, it is desirable to employ an excess of the oxyaryl reactant over the stoichiometric amount, and preferably in excess of two moles of the oxyaryl reactant per mole of the $C_3H_4$ hydrocarbon.

According to my experience, best yields of the 2,2-bis(oxyaryl)propane are obtained when using about five to seven moles of the oxyaryl reactant per mole of the $C_3H_4$ reactant.

The acidic condensation agents which I have found to be useful include the Friedel-Crafts type such as the halides of boron, aluminum, zinc, iron, and tin, and the mineral acids, such as sulfuric acid, phenol sulfonic acid, and hydrogen fluoride. The Friedel-Crafts condensing agents are preferred for best yields, and boron trifluoride especially preferred when using phenol as the oxyaryl reactant.

Phenol is known to form an insoluble complex, however, in contact with aluminum chloride which inactivates the aluminum chloride to such a degree that it fails to promote the reaction of the $C_3H_4$ hydrocarbon. Because of this reason, they should not be employed together. However, in the process of this invention I have found aluminum chloride to be a useful condensing agent when employed with oxyaryl compounds other than phenol and cresol. If desired, mixtures of two or more acidic condensing agents can be employed.

I have found it preferable to employ the acidic condensing agents in amounts from about 1 to about 5 parts per 100 parts by weight of the oxyaryl compound used. Greater or lesser amounts can also be used. It is also preferred that the acidic condensing agents and the reactants be substantially free of water as the presence of water adversely affects the rate of formation of the desired 2,2-bis(oxyaryl)propane compounds. Since water is not a product of this reaction, substantially anhydrous reaction conditions can be maintained by drying the reactants and condensing agent before use. However, it is not a critical requirement of my process that anhydrous conditions must be maintained, for the presence of a small amount of water in the acidic condensing agent or reactants can be tolerated. Boron trifluoride monohydrate ($BF_3 \cdot H_2O$) for instance, will act as a condensing agent but will result in a slower rate of reaction than when anhydrous boron trifluoride is used.

The reaction of the oxyaryl compound and the $C_3H_4$ hydrocarbon proceeds at moderate temperatures, such as those within the range of about 0° C. to about 100° C., with temperatures within the range of 30° C. to about 60° C. being preferred. According to my experience, the yields are low in reactions carried out at less than 0° C. When using the normally solid oxyaryl compounds, as phenol and ortho-cresol, it is preferred that the temperature be above about 40° C. or at least sufficient to provide for liquid phase reaction conditions. Temperatures above about 100° C. have been found not to be too desirable because of the possibility of side reactions and decomposition of the product which can be encountered, with a consequent reduction in yield of the desired product.

Contact time of the reactants is not critical in my process. In carrying out my process in a batchwise manner, contact time can range from about 15 minutes to 5 hours or more, depending upon the selected temperature and rate of addition of the $C_3H_4$ reactant. In a continuous or semi-continuous process, the actual contact or reaction time might be much shorter. Subatmospheric or superatmospheric pressures can also be employed, but atmospheric pressures are most convenient.

The 2,2-bis(oxyaryl)propane compounds prepared in accordance with the process of this invention can be recovered from the reaction mixture by conventional means, such as by distillation, crystallization, and extraction operations. The preferred methods are by distilling the reaction mixture under reduced pressures after the acidic agent is removed, to recover the product as the distillation residue, or else by removing the acidic condensing agent by diluting the reaction mixture with a mixture of cold water and ice or a mixture of ice and dilute hydrochloric acid and recovering the organic products. However, the method of recovery of the product is not critcial, and any method occurring to those skilled in the art, chemically or otherwise, of removing the catalyst or product can be used.

When phenol is employed as a reactant, the 2,2-bis(4-hydroxyphenyl)propane thus produced is easily removed from the reaction mixture by crystallization of a complex formed between phenol and 2,2-bis(4-hydroxyphenyl)propane at a temperature below about 90° C. The crystalline complex is easily removed from the reaction mixture by filtration. The complex can be decomposed by the application of heat as in distillation to distill off the unreacted phenol, or by washing the crystalline matter with hot water to wash out the phenol.

The former method is preferred since the water treatment results in wet phenol which should be topped or dried before reuse. Also, some of the 2,2-bis(4-hydroxyphenyl)propane may be lost due to a slight solubility in water. The thermal decomposition of the crystalline complex is accomplished by heating the crystalline complex under a reduced pressure of about 25–70 mm. at about 100° C.–125° C. and then heating to 200° C.–220° C. for short periods of time to drive off last traces of phenol. The 2,2-bis(4-hydroxyphenyl)propane thus recovered is usually above 95–97 percent pure.

The recovery of the 2,2-bis(oxyaryl)propane made using boron trifluoride as the acidic condensing agent may also be accomplished by neutralizing the boron trifluoride by the addition of an excess of calcium oxide and water. After filtration to remove the inorganic material, the solution can be distilled to recover the unreacted phenol and remove the water. The 2,2-bis(4-hydroxyphenyl)propane is recovered from the still residue. The residue can, if desired, be washed with chloroform or recrystallized from dilute acetic acid to further purify the product.

Other 2,2-bis(oxyaryl)propanes made by this process are preferably recovered by removing the acidic condensation agent by pouring the reaction mixture over ice or ice and dilute hydrochloric acid, and distilling the organic portion of the washed reaction mixture. Since most of the acidic agents employed here are soluble in either ice water, cold water or cold dilute hydrochloric acid, and the oxyaryl reactants, other than phenol, and the product is not, the organic portion of the reaction mixture is separated from the cold aqueous mixture and distilled to recover the 2,2-bis(oxyaryl)propane produced in the reaction as the still residue. Other recovery methods will occur to those skilled in the art.

The following examples are illustrative.

*Example 1*

To 281.2 grams (3 moles) of reagent grade phenol which had been topped to removed the water present, 7.3 grams (0.17 mole) of boron trifluoride was added at 50° C.–55° C. by bubbling the boron trifluoride through the molten phenol until the desired weight of catalyst had been added, as determined by periodically weighing the reaction flask. Air was excluded in the reaction by sweeping the system for two minues with nitrogen, and 20.0 grams (0.5 mole) of propadiene as a gas were slowly added below the liquid level of the phenol-catalyst mixture. The reaction was maintained at 50° C.–55° C. during the 32 minutes that the propadiene was being added.

The product was recovered after the reaction was completed by adding 50 ml. of cold water and 11.1 grams (0.2 mole) of calcium oxide to the reaction mixture and filtering the mixture at 50° C.–55° C. to remove the inorganic matter. The water and unreacted phenol were removed from the washed reaction mixture by distillation at 10–15 mm. pressure and the pot residue consisted of nearly pure 2,2-bis(4-hydroxyphenyl)propane melting at 158° C. A yield of 85.9 percent of 2,2-bis(4-hydroxyphenyl)propane based on propadiene added was realized.

*Example 2*

To 324 grams (3.0 moles) of reagent grade anisole maintained at 39° C., 13.5 grams (0.10 mole) of anhydrous aluminum chloride was added with mixing and the system flushed with nitrogen for two minutes. To this mixture 19.9 grams (0.50 mole) of propadiene as a gas was slowly added below the surface of the liquid over a period of about 100 minutes while the temperature was maintained at 39° C.–47° C. On completion of the addition of the propadiene, the reaction mixture then was poured into a mixture of ice and 10 percent hydrochloric acid. A yellow layer rising to the top of the ice mixture was removed and diluted with 100 ml. of diethyl ether to facilitate phase separations. The organic layer was washed successively with 100 ml. portions of 10 percent hydrochloric acid, water, 5 percent sodium hydroxide and twice more with water. Unreacted anisole was removed from the washed material by distillation at 10 mm. pressure, and colorless 2,2-bis(4-methoxyphenyl)propane was obtained as the distillate by reducing the pressure in the still to 3 mm.

Yield of the 2,2-bis(4-methoxyphenyl)propane was 43 percent based on propadiene, having the following properties: boiling point 183° C.–189° C. (3 mm.); $n_D^{20} = 1.692$; elemental analysis; C, 80.1; H, 8.2. Reported physical properties of this compound are: boiling point 190° C. (5 mm.); $n_D^{20}=1.5696$; calculated elemental analysis; C, 79.7; H, 7.9.

Infra-red absorption spectrum indicated predominantly para substitution on the aromatic nucleus. Further confirmation of the product was obtained by cleaving the methyl ether to give the known 2,2-bis(4-hydroxyphenyl)propane. A mixed melting point with an authentic sample gave no depression.

Example 3

To 141 grams (1.5 moles) of phenol which had been topped to remove any water present, anhydrous boron trifluoride was added by bubbling through the molten phenol until 1.4 grams (0.02 mole) had been absorbed as determined by periodic weighing of the reaction flask after which 8 grams (0.20 mole) of propyne was added as a gas below the liquid level of the mixture over a period of 32 minutes while stirring. The reaction temperature was maintained at 50° C. during the addition. At the termination of the addition of the propyne, the reaction mixture was stirred for an additional 45 minutes while cooling to a temperature below 40° C. to cause the phenol-2,2-bis(4-hydroxyphenyl)propane complex to crystallize in the reaction mixture. The crystals were filtered off at about 41° C. and washed with 53.5 grams of fresh molten dry phenol. This crystalline complex was decomposed by heating at 20 mm. pressure to drive off the phenol from the complex, and 24.5 grams of pure 2,2-bis(4-hydroxyphenyl)propane were recovered from the still residue, which had a clear melting point of 158° C. This represents a yield of 54–55 percent of the 2,2-bis(4-hydroxyphenyl)propane based on propyne.

Example 4

To 649 grams (5 moles) of redistilled orthocresol at 35° C., 9.8 grams (0.14 mole) of boron trifluoride was added with stirring by bubbling the boron trifluoride through the molten cresol until the desired weight of catalyst had been added and the system was purged with nitrogen. Then 43.7 grams (1.09 moles) of propadiene gas was slowly added with stirring over a five hour period at a point below the surface of the cresol-catalyst mixture, while maintaining the temperature at 49° C.–55° C. The reaction mixture was stirred for 30 minutes after the addition of the propadiene was completed.

The product was recovered by decomposing the catalyst with 15 ml. of water and 10 grams (0.18 mole) of calcium oxide. After standing for two days the inorganic precipitate was filtered off and 10 more grams of calcium oxide added. The unreacted o-cresol was removed by distillation at 20 mm. pressure at a temperature of 182° C. The still residue was fractionally distilled at 1 mm. pressure and 151 grams of crude 2,2-bis(4-hydroxy-3-methylphenyl)propane was collected between 187° C.–194° C. This represents a yield of 54 percent. Crystals of pure 2,2-bis(4-hydroxy-3-methylphenyl)propane were obtained from a benzene-n-hexane solution after prolonged standing at about 2° C. This compound had a melting point of 99° C.–105° C., and an elemental analysis as follows: C, 79.49; H, 8.03; phenolic OH, 12.66. Calculated analysis for $C_{17}H_{20}O_2$ is C, 79.65; H, 7.87; phenolic OH, 13.27. Previous reported melting points of 2,2-bis(4-hydroxy-3-methylphenyl)propane are not consistent, varying from 96.5° C. to 140° C.

Example 5

To 280.0 grams (2.59 moles) of reagent grade anisole, 11.7 grams (.089 mole) of anhydrous aluminum chloride was added with stirring and the system flushed with nitrogen. To this mixture 8.3 grams (.458 mole) of propyne as a gas was slowly added at a point below the surface of the liquid over a period of about 50 minutes, while the reaction temperature was maintained at 33° C.–46° C. On completion of the addition of the propyne, the reaction mixture was stirred for an additional one-half hour while cooling to room temperature. The reaction mixture was worked up in the usual manner by decomposing the catalyst with cold water and washing with 100 ml. portions of 10 percent HCl solution, water and dilute alkali. The unreacted anisole was stripped off and the product, 2,2-bis(4-methoxyphenyl)propane, was isolated by distillation. A 30 percent yield of product boiling at 176° C.–178° C. at 2 mm. Hg pressure was isolated.

Example 6

To 141 grams (1.5 moles) of reagent grade phenol, which had been topped to remove any water present, 1.5 grams of boron trifluoride was added with stirring, and the system was purged with nitrogen for 2 minutes. After purging, ten grams (0.25 mole) of propadiene were slowly added at a point below the surface of the phenol-catalyst mixture over a period of 14 minutes while the temperature was maintained at 50° C.–55° C. The reaction mixture was permitted to cool to room temperature and copious crystallization occurred.

The reaction mixture was heated to 41° C.–42° C. and filtered at that temperature, saving both the solid crystalline material and the filtrate which contained unreacted phenol and part of the catalyst. The solid phenol-bisphenol complex was washed with fresh molten phenol to remove the last of the adhering boron trifluoride catalyst. The crystalline matter was distilled at a reduced pressure of 20 mm. Hg, recovering overhead the remainder of the unreacted phenol, leaving 2,2-bis(4-hydroxyphenol)propane as the still residue. Yield was 61 percent based on propadiene. The 2,2-bis(4-hydroxyphenyl)propane had a melting point of 156° C.

The phenol-catalyst filtrate and the phenol used for washing the crystalline complex were combined and additional phenol added so that there was again approximately 1.5 moles of phenol and the catalyst again comprised 1 percent of the weight of the phenol. To this phenol-catalyst mixture, at a temperature of 50° C.–55° C., 10 grams of propadiene (0.25 mole) was slowly added over a period of 42 minutes. Product recovery was the same as in the first part, and yield on this recycle run of 2,2-bis(4-hydroxyphenyl)propane was 76 percent based on propadiene. The product had a melting point of 150° C.

This run shows that the process can be continuous or semi-continuous, utilizing the recycle phenol and catalyst.

Example 7

To 141 grams (1.5 moles) of phenol there was slowly added 1.4 grams (1 percent) of boron trifluoride as the acidic condensing agent. The mixture was maintained at 50° C.–55° C. while a gaseous mixture of propyne (33.7 mole percent) and propadiene (65.1 mole percent) was slowly introduced below the surface of the liquid phenol-catalyst mixture over a period of one hour and twenty minutes. Upon the completion of the reaction, the product was isolated as described in Example 6. The 2,2-bis(4-hydroxyphenyl)propane, isolated as a pot residue, had a good color and a melting point of 153° C.

Example 8

To 62.9 grams (0.51 mole) of ortho-methyl anisole, there was added 6.8 grams (0.051 mole) of anhydrous aluminum chloride as the condensing agent. The mixture was maintained at 50° C.–55° C. as propyne gas was slowly introduced into the reaction mixture beneath the surface of the liquid. The procedure of Example 2 was followed to remove the aluminum chloride, and the remaining mixture stripped at 50 mm. Hg pressure to recover the unreacted ortho-methyl anisole. A yield of 54 percent of 2,2-bis(4-methoxy-3-methylphenyl)propane was recovered.

The product was very viscous, having an elemental analysis as follows: Carbon 80.24%; hydrogen, 8.52%; oxygen (by difference), 11.24%. Calculated analysis for 2,2-bis(4-methoxy-3-methylphenyl)propane is as follows:

Carbon 80.3%; hydrogen, 8.51%; oxygen (by difference), 11.19%.

I claim:

1. A process for producing a 2,2-bis(oxyaryl)propane which comprises admixing and reacting an acyclic $C_3H_4$ hydrocarbon with an oxyaryl compound having the general formula

wherein $R^1$ and $R^2$ are selected from the group consisting of hydrogen and lower alkyl groups in the presence of an acidic condensation agent selected from the group consisting of the Friedel-Crafts catalysts and sulfuric acid, phenol acid, and hydrogen fluoride, with the proviso that when $R^1$ and $R^2$ are hydrogens, aluminum chloride is excluded as the acidic condensing agent, at a temperature within the range of about 0° C. to about 100° C., said oxyaryl compound being present in molar amounts of at least two moles per mole of said $C_3H_4$ hydrocarbon.

2. The process for producing a 2,2-bis(oxyaryl)propane which comprises admixing and reacting propadiene with an oxyaryl compound having the general formula

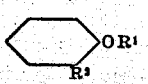

wherein $R^1$ and $R^2$ are members selected from the group consisting of hydrogen and lower alkyl groups in the presence of an acidic condensing agent selected from the group consisting of the Friedel-Crafts catalysts and sulfuric acid, phenol sulfonic acid, and hydrogen fluoride, with the proviso that when $R^1$ and $R^2$ are hydrogens, aluminum chloride is excluded as the acidic condensing agent, at a temperature within the range of about 0° C. to about 100° C.

3. The process for producing a 2,2-bis(oxyaryl)propane which comprises admixing and reacting propyne with an oxyaryl compound having the general formula

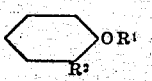

wherein $R^1$ and $R^2$ are members selected from the group consisting of hydrogen and lower alkyl groups in the presence of an acidic condensation agent selected from the group consisting of the Friedel-Crafts catalysts and sulfuric acid, phenol sulfonic acid, and hydrogen fluoride, with the proviso that when $R^1$ and $R^2$ are hydrogens, aluminum chloride is excluded as the acidic condensing agent, at a temperature within the range of about 0° C. to about 100° C.

4. The process for producing 2,2-bis(oxyaryl)propane which comprises admixing and reacting an acyclic $C_3H_4$ hydrocarbon with an oxyaryl compound having the general formula

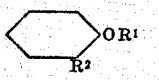

wherein $R^1$ and $R^2$ are members selected from the group consisting of hydrogen and lower alkyl groups in the presence of a Friedel-Crafts catalyst, with the proviso that when $R^1$ and $R^2$ are hydrogens, aluminum chloride is excluded, at a temperature between about 0° C. and about 100° C.

5. The process for producing 2,2-bis(oxyaryl)propane which comprises reacting a mixture of an acyclic $C_3H_4$ hydrocarbon with an oxyaryl compound having the general formula

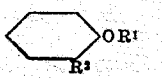

wherein $R^1$ and $R^2$ are members selected from the group consisting of hydrogen and lower alkyl groups, said reactants being present in amounts of at least two moles of the oxyaryl compound per mole of $C_3H_4$ hydrocarbons, in the presence of boron trifluoride at a temperature of from about 0° C. to about 100° C.

6. A process for the production of 2,2-bis(4-hydroxyphenyl)propane which comprises admixing and reacting phenol with an acyclic $C_3H_4$ hydrocarbon in the presence of an acidic condensing agent selected from the group consisting of Friedel-Crafts catalysts and sulfuric acid, phenol sulfonic acid and hydrogen fluoride, with the proviso that aluminum chloride is excluded as the acidic condensing agent at a temperature within the range of about 0° C. to about 100° C.

7. A process according to claim 6 wherein the $C_3H_4$ hydrocarbon is propadiene.

8. A process according to claim 6 wherein the $C_3H_4$ hydrocarbon is propyne.

9. A process according to claim 6 wherein the $C_3H_4$ hydrocarbon is a mixture of propadiene and propyne.

10. A process for the production of 2,2-bis(4-hydroxyphenyl)propane which includes the steps of slowly bubbling an acyclic $C_3H_4$ hydrocarbon gas through a mixture of phenol and an acidic condensing agent selected from the group consisting of Friedel-Crafts catalysts and sulfuric acid, phenol sulfonic acid and hydrogen fluoride, with the proviso that aluminum chloride is excluded as the acidic condensing agent maintained at a temperature of between about 0° C. and about 100° C., and recovering the 2,2-bis(4-hydroxyphenyl)propane thus produced.

11. A process according to claim 10 wherein the $C_3H_4$ hydrocarbon is propadiene.

12. A process according to claim 10 wherein the $C_3H_4$ hydrocarbon is propyne.

13. A process according to claim 10 wherein the $C_3H_4$ hydrocarbon is a mixture of propadiene and propyne.

14. A process for the production of 2,2-bis(4-hydroxyphenyl)propane which includes the steps of heating a mixture of phenol and an acidic condensing agent selected from the group consisting of Friedel-Crafts catalysts and sulfuric acid, phenol sulfonic acid and hydrogen fluoride, with the proviso that aluminum chloride is excluded as the acidic condensing agent to a temperature within the range from about 40° C. to about 100° C. and adding an acyclic $C_3H_4$ hydrocarbon, and thereafter recovering the 2,2-bis(4-hydroxyphenyl)propane thus produced.

15. A process for the production of 2,2-bis(4-methoxyphenol)propane which includes the steps of slowly bubbling an acyclic $C_3H_4$ hydrocarbon through a mixture of anisole and an acidic condensing agent selected from the group consisting of Friedel-Crafts catalysts and sulfuric acid, phenol sulfonic acid and hydrogen fluoride, at a temperature of between about 0° C. and about 100° C., and thereafter recovering the 2,2-bis(4-methoxyphenyl)propane thus produced.

16. A process for the production of 2,2-bis(4-hydroxy-3-methylphenyl)propane which includes the steps of slowly bubbling a $C_3H_4$ hydrocarbon through a mixture of ortho-cresol and an acidic condensing agent selected from the group consisting of Friedel-Crafts catalysts and sulfuric acid, phenol sulfonic acid and hydrogen fluoride, at a temperature of between about 0° C. and about 100° C., and thereafter recovering the 2,2-bis(4-hydroxy-3-methylphenyl)propane thus produced.

17. A process for the production of 2,2-bis(4-methoxy-3-methylphenyl)propane which includes the steps of slowly bubbling an acyclic $C_3H_4$ hydrocarbon through a mixture of ortho-methyl anisole and an acidic condensing agent selected from the group consisting of Friedel-Crafts catalysts and sulfuric acid, phenol sulfonic acid and hydrogen fluoride, at a temperature of between about 0° C. and about 100° C., and thereafter recovering the 2,2-bis-(4-methoxy-3-methylphenyl)propane thus produced.

18. A process for producing a 2,2-bis(oxyaryl)propane which includes the steps of admixing and reacting propyne with an oxyaryl compound having the general formula

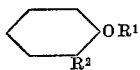

wherein $R^1$ and $R^2$ are members selected from the group consisting of hydrogen and lower alkyl groups in the presence of a Friedel-Crafts catalyst, with the proviso that when $R^1$ and $R^2$ are hydrogens, aluminum chloride is excluded, at a temperature between about 30° C. and about 60° C.

19. A process for the production of 2,2-bis(4-hydroxyphenyl)propane which includes the steps of admixing and reacting propyne and phenol in the presence of a Friedel-Crafts catalyst excepting aluminum chloride at a temperature between about 30° C. and about 60° C.

20. A process for the production of 2,2-bis(4-hydroxyphenyl)propane which includes the steps of slowly bubbling an acyclic $C_3H_4$ hydrocarbon gas through a mixture of phenol and boron trifluoride maintained at a temperature of between about 0° C. and about 100° C., and recovering the 2,2-bis(4-hydroxyphenyl)propane thus produced.

21. A process for the production of 2,2-bis(4-hydroxyphenyl)propane which includes the steps of heating a mixture of phenol and boron trifluoride to a temperature within the range from about 40° C. to about 100° C. and adding an acyclic $C_3H_4$ hydrocarbon, and thereafter recovering the 2,2-bis(4-hydroxyphenyl)propane thus produced.

References Cited in the file of this patent
UNITED STATES PATENTS

| | | |
|---|---|---|
| 1,742,519 | Schrimpe | Jan. 7, 1930 |
| 1,961,397 | Schoeller et al. | June 5, 1934 |
| 2,072,825 | Reppe et al. | Mar. 2, 1937 |
| 2,602,822 | Schwarzer et al. | July 8, 1952 |

OTHER REFERENCES

Royals: Advanced Organic Chemistry, 1954, p. 380.

UNITED STATES PATENT OFFICE

CERTIFICATE OF CORRECTION

Patent No. 2,884,462                                                                     April 28, 1959

Joseph P. Henry

It is hereby certified that error appears in the printed specification of the above numbered patent requiring correction and that the said Letters Patent should read as corrected below.

Column 4, line 28, for "removed" read -- remove --; column 7, line 16, after "phenol" insert -- sulfonic --.

Signed and sealed this 15th day of December 1959.

(SEAL)

Attest:

KARL H. AXLINE
Attesting Officer

ROBERT C. WATSON
Commissioner of Patents